(12) United States Patent
Peng

(10) Patent No.: US 8,169,297 B2
(45) Date of Patent: May 1, 2012

(54) ELECTRONIC ASSEMBLY HAVING MEANS TO PREVENT NON-PERMITTED DISASSEMBLING OF ITS COMPONENTS

(75) Inventor: Wen-Yu Peng, Hsinchu (TW)

(73) Assignee: Gemtek Technology Co., Ltd., Hukou Township, Hsinchu County (TW)

( * ) Notice: Subject to any disclaimer, the term of this patent is extended or adjusted under 35 U.S.C. 154(b) by 601 days.

(21) Appl. No.: 12/392,409

(22) Filed: Feb. 25, 2009

(65) Prior Publication Data

US 2010/0039219 A1 Feb. 18, 2010

(30) Foreign Application Priority Data

Aug. 18, 2008 (TW) ................ 97131446 A

(51) Int. Cl.
G08B 23/00 (2006.01)
H04B 1/00 (2006.01)
H04L 9/14 (2006.01)
H04Q 1/00 (2006.01)

(52) U.S. Cl. ............... 340/5.31; 439/331; 206/459.1

(58) Field of Classification Search .............. 340/5.31; 439/331; 361/686; 206/459.1; 403/27
See application file for complete search history.

(56) References Cited

U.S. PATENT DOCUMENTS

| | | | | |
|---|---|---|---|---|
| 4,622,541 A * | 11/1986 | Stockdale | ............. | 340/566 |
| 5,128,996 A * | 7/1992 | Rosenow et al. | ............. | 713/192 |
| 5,150,100 A * | 9/1992 | Black et al. | ............. | 340/555 |
| 5,519,756 A * | 5/1996 | Clift | ............. | 379/44 |
| 5,764,729 A * | 6/1998 | Black et al. | ............. | 379/44 |
| 6,061,447 A * | 5/2000 | Poston | ............. | 379/451 |
| 7,292,145 B2 * | 11/2007 | Castle et al. | ............. | 340/545.6 |
| 7,737,912 B2 * | 6/2010 | Graef et al. | ............. | 345/1.1 |
| 7,820,995 B2 * | 10/2010 | Gadini et al. | ............. | 250/576 |

* cited by examiner

Primary Examiner — Nam V Nguyen
(74) Attorney, Agent, or Firm — Muncy, Geissler, Olds & Lowe, PLLC

(57) ABSTRACT

An electronic assembly includes a terminal unit, a signal connector and a memory device. The terminal unit includes a plurality of terminals consisting of a set of coupler terminals and a set of control terminals. The signal connector is utilized for electrically connecting to the coupler terminals, wherein electrical connection of the signal connector to the coupler terminals results in a first relation signal. The memory device is utilized for storing a first relation data corresponding to the first relation signal. Once the signal connector is electrically disconnected from the coupler terminals and upon required the signal connector is again electrically connected to the terminal unit results in a second relation signal such that the electronic assembly is prevented from being operated in case the second relation signal fails to conform to the first relation signal.

9 Claims, 6 Drawing Sheets

ELECTRONIC ASSEMBLY HAVING MEANS TO PREVENT NON-PERMITTED DISASSEMBLING OF ITS COMPONENTS

This application claims the benefit of Taiwan Patent Application Serial NO. 097131446, filed on Aug. 18, 2008, the subject matter of which is incorporated herein by reference. Unauthorized Encode code non-permitted.

FIELD OF THE INVENTION

The present invention relates to an electronic assembly, more particularly to an electronic assembly, in which a terminal unit is applied to effectively prevent non-permitted disassembly of components of the electronic assembly.

BACKGROUND OF THE INVENTION

Electronic assemblies have become the most purchased consumer items in the market. The electronic assemblies generally include desktop computers, mobile phones, notebook computers, digital cameras, GPS (global positioning system) devices and routers. Most of these electronic assemblies are provided with terminal units for connection with a signal connector for signal transmission.

Most of the electronic assemblies enjoy after purchase thereof free repairing service for a certain period of time. After expiring of the guaranty time, the manufacturers or sale agents generally charge for repairing service. Since the income earned from repairing and maintaining these electronic assemblies is relatively great, the manufacturers do not wish the user to disassemble (or repair) his own item in case the item is in need of repairing or maintaining service. The manufacturers wish the electronic assembly needing repairing or maintaining service to deliver to the original service center since most users are not skilled in the repairing field and that undesired or non-permitted disassembling action generally causes more problems when the item is brought to the service center again. There may occur disputes, and cannot decide who is responsible for the undesired or malfunction of certain components of the electronic assembly.

Therefore, during the mass production process, most manufactures generally install means to prevent undesired or non-permitted disassembling of components of the electronic assembly. The conventional non-permitted disassembling means usually is a solid structure, which is visible and is therefore easily understood by the user such that the user can disassemble the electronic assembly by himself and performs repairing or maintaining service to the electronic assembly.

The main object of the present invention is to provide a terminal unit within the electronic assembly so as to prevent non-permitted disassembling of the components of the electronic assembly.

SUMMARY OF THE INVENTION

The object of the present invention is to provide means to prevent non-permitted disassembling of the components of the electronic assembly. The non-permitted disassembling means is made up of a terminal unit and a software program that is difficult to be decoded so that the components of the electronic assembly are prevented from non-permitted disassembling.

In one aspect of the present invention, an electronic assembly is provided means to prevent non-permitted disassembling of the components. The electronic assembly accordingly includes a terminal unit, a signal connector and a memory device.

The terminal unit includes a plurality of terminals consisting of a coupler terminal and a control terminals. The signal connector is utilized for electrically connecting to the coupler terminal.

When the signal connector is electrically connected to the coupler terminal for the first time, a first relation signal is generated, and the memory device is further stored with a first relation data corresponding to the first relation signal.

When the signal connector is electrically disconnected from the coupler terminal and in case the signal connector is to be electrically connected again to the terminal unit, the signal connector should be electrically connected to the coupler terminal as in the previous time. Under this condition, a second relation signal will be generated. Only when the second relation signal conforms to the first relation signal, the electronic assembly will be operated. In other words, in case the second relation signal does not conform to the first relation signal, the electronic assembly is prevented from being operated.

The terminal unit and a memory device are implemented in the electronic assembly of the present invention to prevent non-permitted disassembling action of its components. Moreover, since the relation data stored within the memory device are encoded in such a manner that it is tremendously difficult to decode the first relation data, thereby effectively preventing non-permitted disassembling of the components within the electronic assembly of the present invention.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Figure 1:
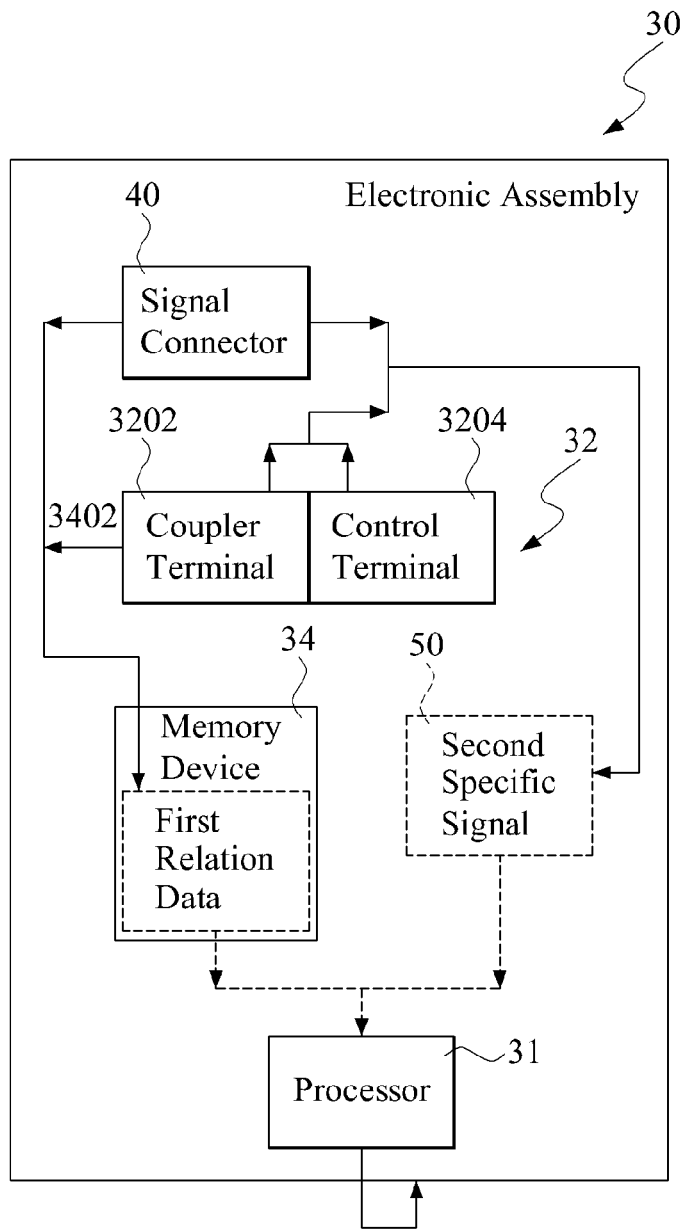
FIG. 1 is a block diagram illustrating components constituting an electronic assembly of the present invention.

FIG. 1 is a block diagram illustrating components constituting an electronic assembly 30 of the present invention. The electronic assembly 30 of the present invention is provided means to prevent non-permitted disassembling of its components. The electronic assembly 30 accordingly includes a terminal unit 32, a first signal connector 40 and a memory device 34.

The terminal unit 32 includes a plurality of terminals consisting of a set of coupler terminals 3202 and a set of control terminals 3204. The first signal connector 40 is utilized for electrically connecting to the coupler terminals 3202.

When the first signal connector 40 is electrically connected to the coupler terminals 3202 for the first time, a first relation signal 3402 is generated. The memory device 34 is utilized for storing a first relation data corresponding to the first relation signal 3402.

The plurality of terminals in the terminal unit 32 are not classified into the coupler terminals or the control terminals in advance. When the first signal connector 40 is connected to certain terminals for the first time, the first relation signal is generated and thus the certain terminals serve as the coupler terminals 3202 while the remaining ones serves as the control terminals 3204.

Due to some reasons, the first signal connector 40 is electrically disconnected from the coupler terminals 3202. After a period of time, the first signal connector 40 is required to be electrically connected again to the terminal unit 32 and thus generates a second relation signal 50.

A processor 31 is provided for comparing and processing the second relation signal 50 relative to the first relation signal 3402. In case, the second relation signal 50 fails to conform to the first relation signal 3402, the electronic assembly 30 is prevented from being operated. The electronic assembly 30 is prevented from being operated indicates that the second relation signal 50 fails to initialize an operating system of the electronic assembly 30. In other words, only when the second relation signal 50 conforms to the first relation signal 3402, the operation system of the electronic assembly 30 is initialized and thus the assembly is operated.

Figure 2:
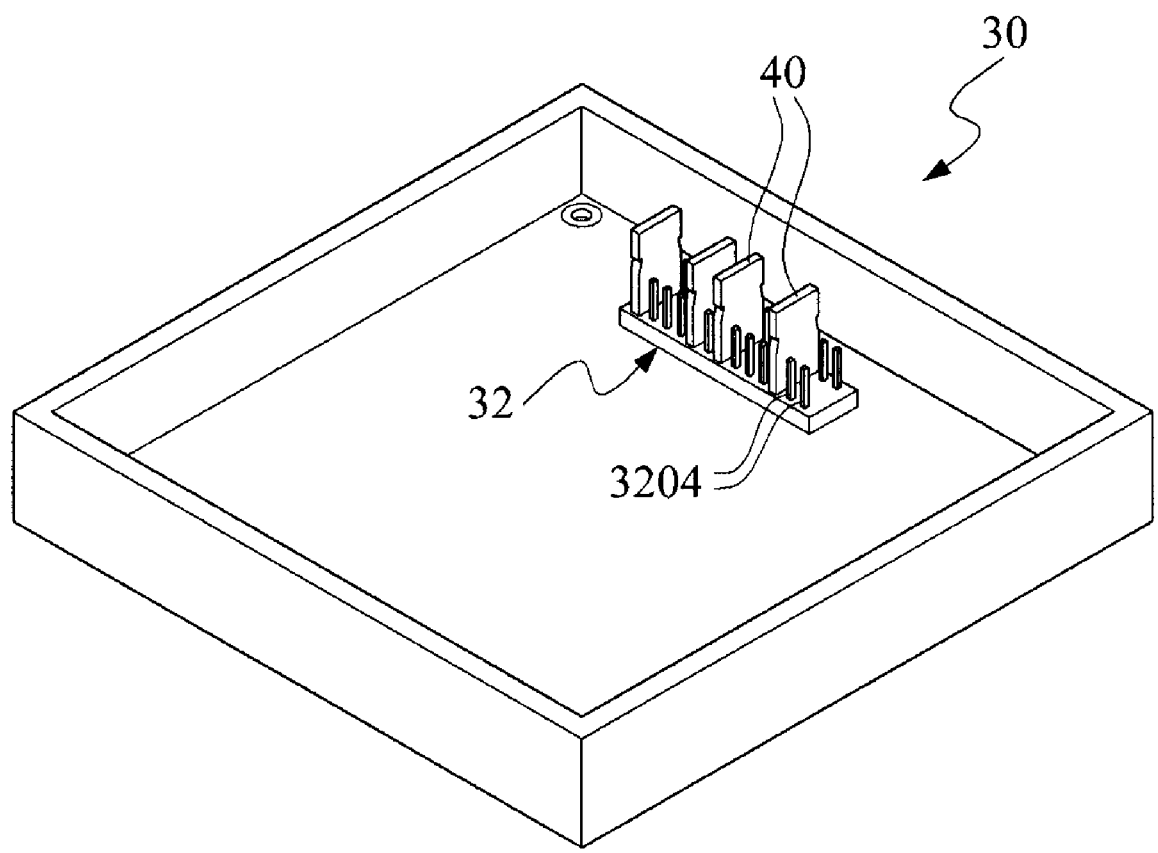
FIG. 2 is a perspective view a portion of the electronic assembly of the present invention.

FIG. 2 is a perspective view a portion of the electronic assembly 30 of the present invention, illustrating mounting of the terminal unit 32 and electrical connection of the first signal connector 40 to the coupler terminals 3202 for the first time (not visible since concealed by the first signal connector 40). The remaining terminals of the terminal unit 32 serve as the control terminals 3204. The first signal connector 40 is to be electrically connected to the coupler terminals 3202 as planned and set by the program and only then the first relation signal will be generated. As shown in FIG. 1, the first relation data 3402 corresponding to the first relation signal are stored within the memory device 34.

Figure 3:
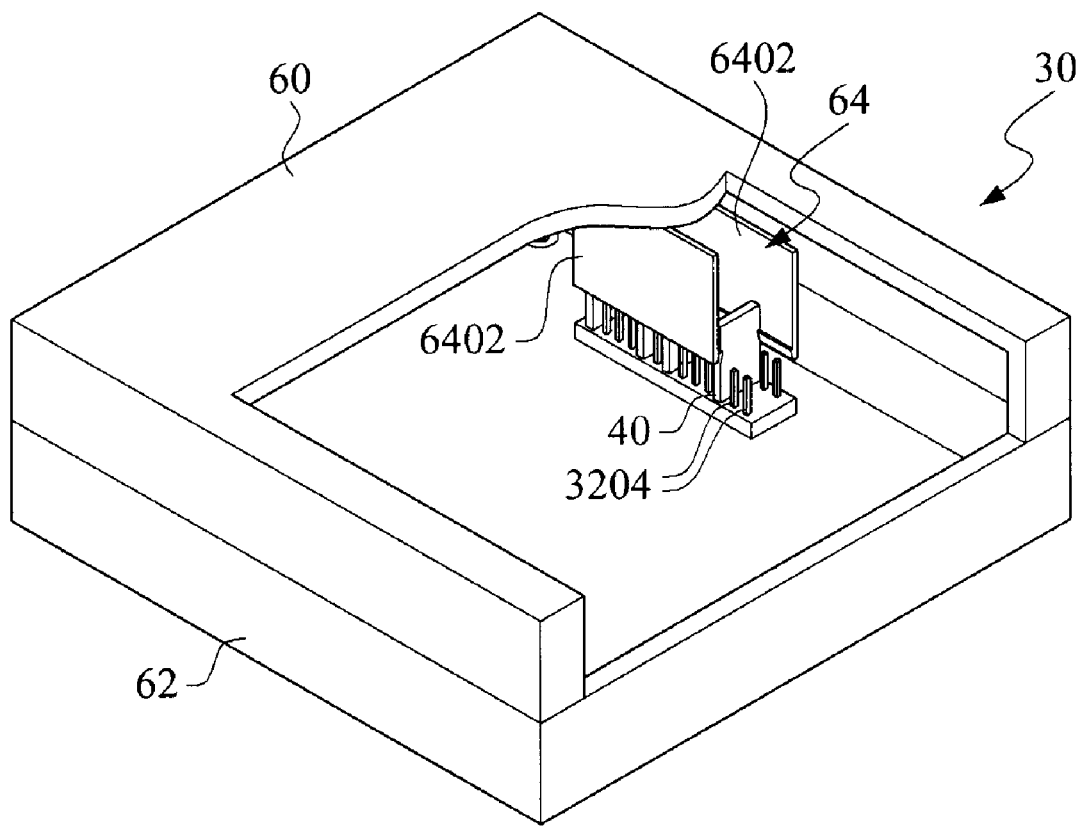
FIG. 3 is a perspective view of the electronic assembly of the present invention, wherein an outer casing is cut away to illustrates its interior thereof.
Figure 4:
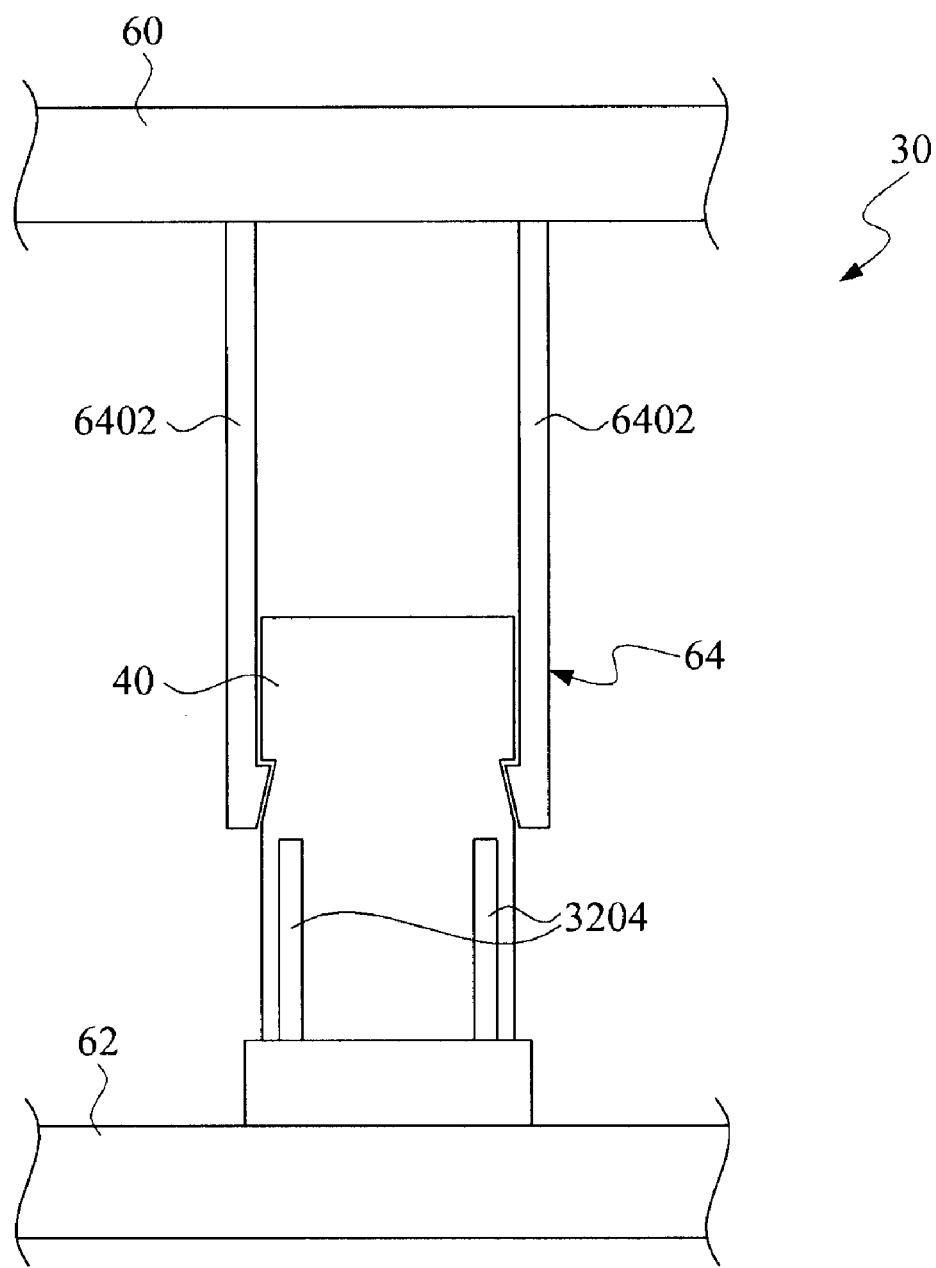
FIG. 4 illustrates a sectional view of an outer casing employed in the electronic assembly of the present invention.

Referring to FIGS. 3 and 4, wherein FIG. 3 is a perspective view of the electronic assembly 30 of the present invention, in which an outer casing is cut away to illustrates its interior thereof. FIG. 4 illustrates a sectional view of an outer casing employed in the electronic assembly 30 of the present invention.

As illustrated, the electronic assembly 30 further includes a lower body 62, an upper body 60 and a clamping unit 64.

The lower body 62 is utilized for supporting the terminal unit 32 securely thereon. The upper body 60 is disposed above the lower body 62 in order to form an outer body.

The clamping unit 64 is fixed to the upper body 62, has two clamp plates 6402 projecting downwardly to clamp the first signal connector 40 therebetween in such a manner mounting of the upper body 60 on the lower body 62 results in electrical connection of the first signal connector 40 to the coupler terminals 3202.

Figure 5:
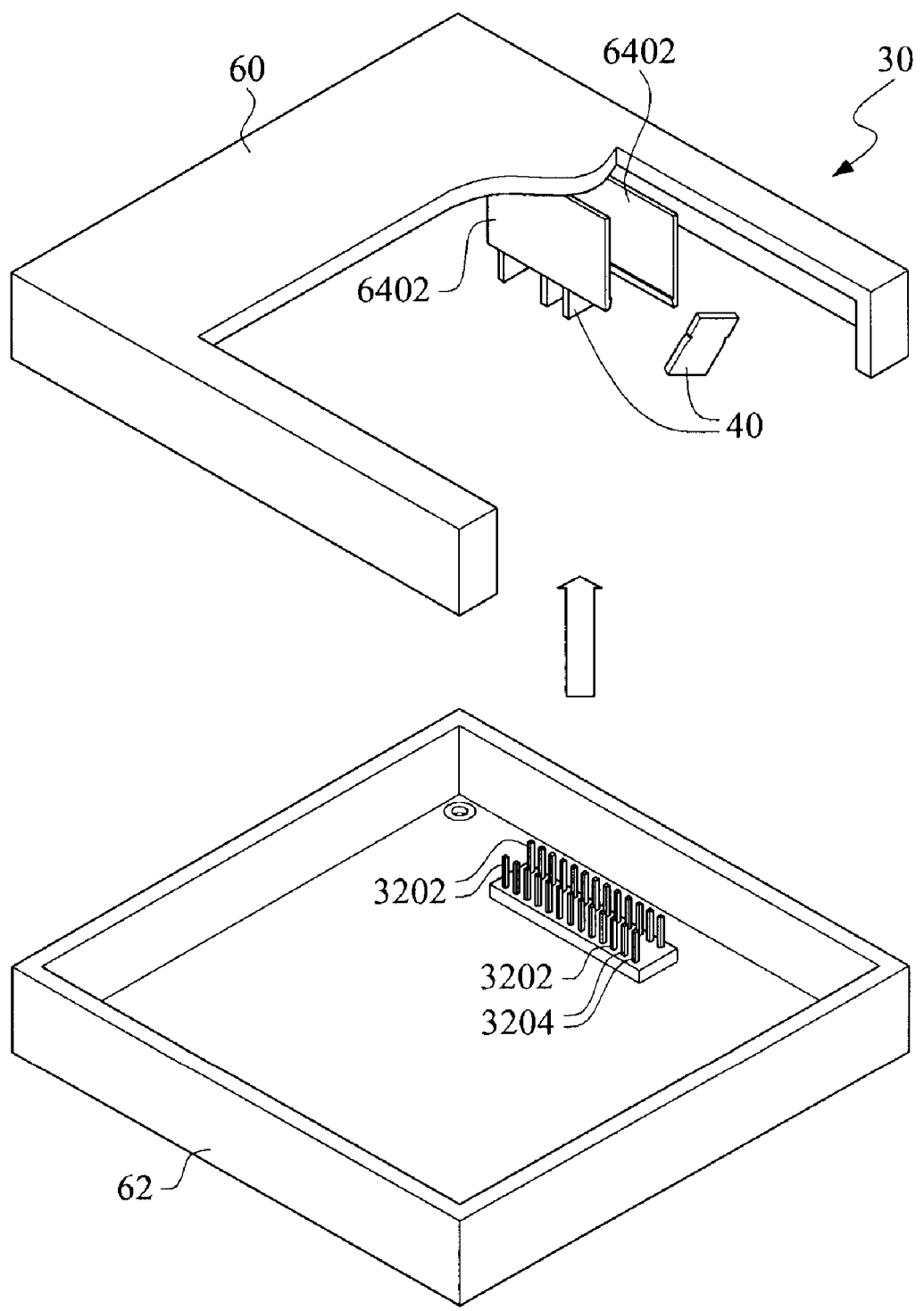
FIG. 5 illustrates when an upper body is removed from a lower body in the electronic assembly of the present invention.

Referring to FIG. 5, under this condition, removal of the upper body 62 relative to the lower body 60 simultaneously results in disengagement of the first signal connector 40 from the coupler terminals 3202. The user is unable to decide which terminal is connected to the first signal connector 40, since the latter is simultaneously removed with the upper body 62 from the lower body 60. When such arranged, the user is unable to decide the precise terminal for connection with the first signal connector 40.

Of course, some restriction, like destroying a portion of the software, can be arranged within the outer casing to prevent the user from assembling the components (inserting of the signal connector into the terminal unit) by himself such that the electronic assembly 30 of the present invention cannot be operated.

Figure 6:
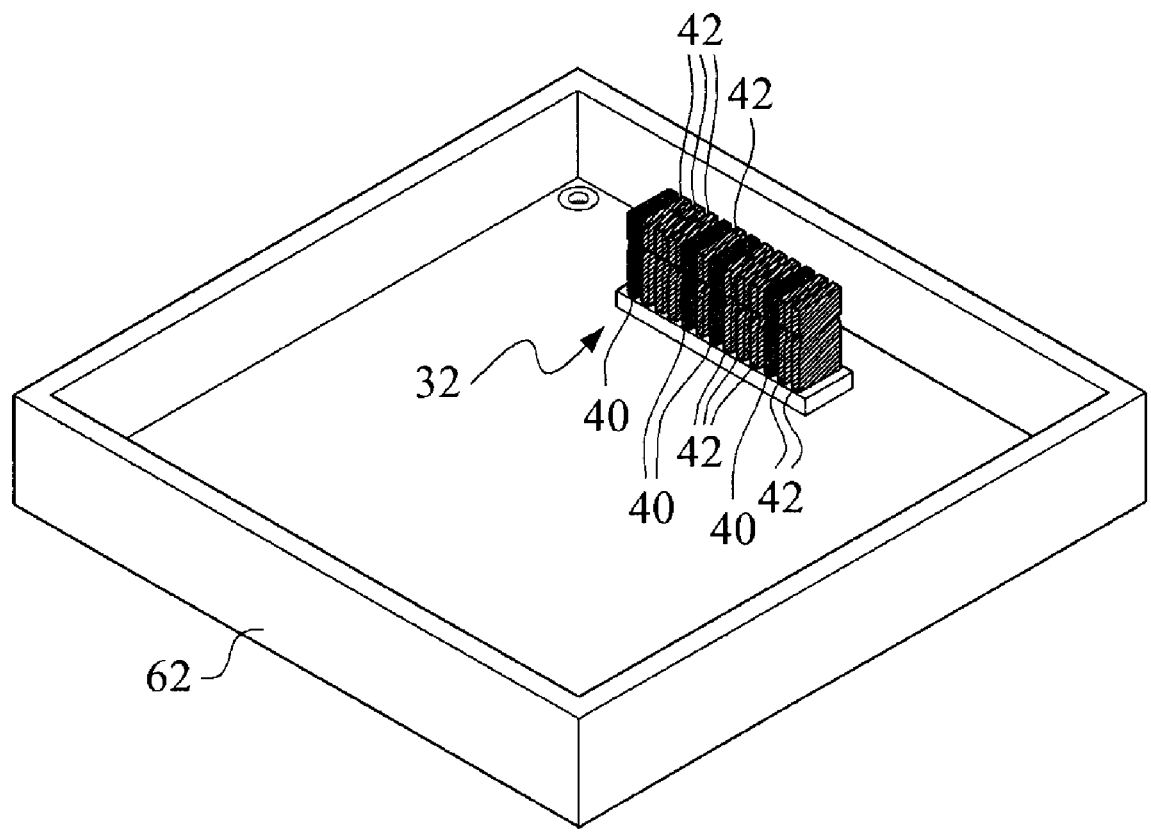
FIG. 6 illustrates how a terminal unit and a signal connector are mounted on the lower body shown in FIG. 5 in the electronic assembly of the present invention.

Referring to FIG. 6, the electronic assembly 30 of the present invention further includes a second signal connector 42, wherein the first and second signal connectors 40, 42 are electrically and respectively connected to the coupler terminals 3202 and the control terminals 3204 while the first and second signal connectors 40, 42 are electrically disconnected to each other. The second signal connector 42 has similar structure like the first signal connector 40 so as to facilitate mounting of the same at the automatic assembly line, thereby preventing the assembly 30 from non-permitted disassembling thereof.

In the event, the electronic assembly 30 is required to be assembled again after the disassembling operation, the original manufacturer can re-set the coupler terminals 3202 in such a manner that the other service center cannot decode the setting of the coupler terminals. Moreover, the first relation data 3402 can be encoded and later stored within the memory device 34 so that the position of the coupler terminals 3202 relative to the lower body 62 needs not be altered. Under this condition, the first signal connector can be connected to the coupler terminals 3202 as in the original service center owing to the stored first relation data, which can be decoded only by the original service center. The repairer at the service center is informed of the decoding process so as to easily locate the precise position of the coupler terminals 3202, thereby permitting the repairer to fittingly and electrically connect the signal connector to the coupler terminals 3202.

In this embodiment, the terminal unit 32 and the memory device constitute the non-permitted disassembling means for the electronic assembly 30 of the present invention. Since the relation data stored with the memory device are hard to decode by an ordinary man, the electronic assembly 30 is duly prevented from being disassembled except in the allowed manner.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An electronic assembly comprising:
   a terminal unit including a plurality of terminals consisting of at least one coupler terminal and at least one control terminal;
   at least one first signal connector for electrically connecting to said coupler terminal, wherein a first relation signal is generated when the first signal connector is electrically connected to the coupler terminal;
   a lower body for supporting said terminal unit thereon;
   an upper body disposed above said lower body in order to form an outer body;
   a clamping unit fixed to said upper body and clamping said first signal connector in such a manner that removal of said upper body relative to said lower body simultaneously results in disengagement of said first signal connector from said coupler terminal;
   a memory device for storing a first relation data corresponding to said first relation signal; and wherein, after said first signal connector is electrically disconnected from said coupler terminal and upon electrical reconnection of said first signal connector to said terminal unit, a second relation signal is generated, the electronic assembly is prevented from being operated when said second relation signal fails to compare with said first relation signal.

2. The electronic assembly according to claim 1, wherein said second relation signal conforms to said relation first signal indicates that said electrical connection of said first signal connector to said coupler terminal results in said second relation signal.

3. The electronic assembly according to claim 1, further comprising a second signal connector, wherein said first and second signal connectors are electrically and respectively connected to said coupler terminal and said control terminals while said first and second signal connectors are electrically disconnected to each other.

4. The electronic assembly according to claim 1, wherein the electronic assembly is prevented from being operated indicates said second relation signal fails to initialize an operating program of the electronic assembly.

5. The electronic assembly according to claim 1, wherein said first relation data is encoded and then stored within said memory device.

6. An electronic assembly comprising:
a terminal unit including a plurality of terminals consisting of at least one coupler terminal and at least one control terminal;
at least one first signal connector for electrically connecting to said coupler terminal, wherein a first relation signal is generated when the first signal connector is electrically connected to the coupler terminal;
a memory device for storing a first relation data corresponding to said first relation signal; and
wherein, after said first signal connector is electrically disconnected from said coupler terminal and upon electrical reconnection of said first signal connector to said terminal unit, a second relation signal is generated, the electronic assembly is prevented from being operated when said second relation signal fails to compare with said first relation signal; and
the electronic assembly being prevented from being operated indicates said second relation signal fails to initialize an operating program of the electronic assembly.

7. The electronic assembly according to claim 6, wherein said second relation signal conforms to said relation first signal indicates that said electrical connection of said first signal connector to said coupler terminal results in said second relation signal.

8. The electronic assembly according to claim 6, further comprising a second signal connector, wherein said first and second signal connectors are electrically and respectively connected to said coupler terminal and said control terminals while said first and second signal connectors are electrically disconnected to each other.

9. The electronic assembly according to claim 6, wherein said first relation data is encoded and then stored within said memory device.

* * * * *